US010867257B2

(12) United States Patent
Morris

(10) Patent No.: US 10,867,257 B2
(45) Date of Patent: Dec. 15, 2020

(54) AUTOMATIC ONLINE ACTIVITY ABUSE REPORT ACCURACY PREDICTION METHOD AND APPARATUS

(71) Applicant: VERIZON MEDIA INC., New York, NY (US)

(72) Inventor: Robin Morris, Palo Alto, CA (US)

(73) Assignee: VERIZON MEDIA INC., New York, NY (US)

( * ) Notice: Subject to any disclaimer, the term of this patent is extended or adjusted under 35 U.S.C. 154(b) by 739 days.

(21) Appl. No.: 15/592,703

(22) Filed: May 11, 2017

(65) Prior Publication Data

US 2018/0330244 A1 Nov. 15, 2018

(51) Int. Cl.
*G06N 5/04* (2006.01)
*G06N 20/00* (2019.01)
*G06Q 50/00* (2012.01)
*G06Q 30/02* (2012.01)
*G06Q 10/10* (2012.01)

(52) U.S. Cl.
CPC .............. *G06N 20/00* (2019.01); *G06Q 10/10* (2013.01); *G06Q 30/0241* (2013.01); *G06Q 50/01* (2013.01); *G06N 5/04* (2013.01)

(58) Field of Classification Search
None
See application file for complete search history.

(56) References Cited

PUBLICATIONS

Papegnies, et al., Impact of Content Features for Automatic Online Abuse Detection, arXiv, Apr. 11, 2017, pp. 1-16 (Year: 2017).*
Thomas, et al., Design and Evaluation of a Real-Time URL Spam Filtering Service, 2011 IEEE Symposium on Security and Privacy, 2011, pp. 447-462 (Year: 2011).*
Blum, et al., Lexical Feature Based Phishing URL Detection Using Online Learning, AISec'10, 2010, pp. 54-60. (Year: 2010).*
Efron et al., "An Introduction to the Bootstrap," Monographs on Statistics and Applied Probability 57 (1993).
Mishne et al., "Blocking Blog Spam with Language Model Disagreement," 6 pages (2005).
Ramachandran et al., "Understanding the Network-Level Behavior of Spammers," 12 pages (2006).
Haste et al., "The Elements of Statistical Learning, Data Mining, Inference, and Prediction," Second Edition (2009).

(Continued)

*Primary Examiner* — Wilbert L Starks
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically predicting the accuracy of an abuse report and determining, in accordance with the automatically-determined accuracy of the abuse report, an appropriate action(s) to be taken in response to the abuse report.

20 Claims, 6 Drawing Sheets

(56) References Cited

PUBLICATIONS

Kantchelian et al., "Robust Detection of Comment Spam Using Entropy Rate," In Proceedings of 5th ACM Workshop on Artificial Intelligence and Security, pp. 59-70 (2012).
Kleiner et al., "A scalable bootstrap for massive data," J.R. Statist. Soc. B, 76, part 4, pp. 795-816 (2014).
Langford, John "Home," http://github.com/JohnLangford/vowpal_wabbit/wiki; 3 pages (2017).

* cited by examiner

Figure 5

| Summary Statistics ~502 | Estimated Probability ~504 |
|---|---|
| # posts by all users<br># abuse reports by all users | p(a post is reported) |
| # posts by user Y<br># posts by user Y that were reported by all users | p(a post by user Y is reported) |
| # posts by user Y that were reported by all users<br># posts by user Y that were reported and subsequently editorially confirmed | p(a post by user Y that is reported is confirmed as abusive) |
| # posts by all users<br># reports by user X | p(a post is reported by user X) |
| # reports by user X<br># reports by user X that were editorially confirmed | p(report by user X is confirmed as accurate) |
| # posts by user Y<br># of posts by user Y that were reported by user X | p(post by user Y is reported by user X) |
| # of posts by user Y that were reported by user X<br># of posts by user Y that were reported by user X that were editorially confirmed | p(post by user Y that is reported by user X is subsequently confirmed as accurate) |

AUTOMATIC ONLINE ACTIVITY ABUSE REPORT ACCURACY PREDICTION METHOD AND APPARATUS

FIELD OF THE DISCLOSURE

The present disclosure relates to online user activity, and more particularly to predicting the accuracy of reports of abusive online user activity, such as and without limitation predicting the accuracy of the report(s) of abusive user-generated online content.

BACKGROUND

There are now a number of online site providers hosting user-generated content. In many cases, the user-generated content made available via online web sites of these providers is typically disseminated to a wide audience, e.g., online users of an online site providing the user-generated content via a number of web pages of the online site. By way of some non-limiting examples, an online site can be social networking site, such as Yahoo! Answers™ Yahoo! Screen™, Flickr™, Facebook™, Google+™, LinkedIn™ Twitter™, Tumblr™ or the like. Examples of types of user-generated, or user-supplied, content include without limitation, image, text, audio, multimedia or the like. Typically, the content provided by a user to an online site is provided to other users of the online site; however, some user-generated content can be considered to be offensive, or abusive, with respect to one or more guidelines for user-generated content. In such a case, a user may submit a report, via an online site, to the provider of the online site. Access to user-generated content that is considered to be abusive can be restricted or prohibited. By its nature, an "abuse report" made by an online user is subjective, and the assessment by one or more users may not be shared by all users of an online site. Thus, restricting access, or completely banning access, based solely on the existence of an abuse report can result in access to the reported content being unnecessarily restricted. However, a report of abusive content that is in face abusive should be acted upon as quickly as possible so that the abusive content can be restricted or taken off the site entirely.

SUMMARY

The present disclosure provides novel systems and methods for automatic online activity abuse report accuracy prediction. When accurate, abuse reports received from online users provide a useful resource in identifying user-generated content that should be restricted or prohibiting from being accessed. On the other hand, when inaccurate, abuse reports can lead to needless access restriction or prohibition of user-generated content.

An abuse report in connection with UGC is any input, submission, etc. made by a reporting entity, or reporter, (e.g., a user of an online site disseminating the UCG) indicating that the UGC is, at least in the opinion of the reporting entity, violative of at least one community standard (e.g., one or more community standards of the online site(s) disseminating the UGC). Presently, when an abuse report is submitted, the submission is forwarded to a human editor for review of the UGC being reported. The human editor must review the content to determine whether the reported content does indeed violate a standard (or guideline) for content available via an online site, or whether the reporter was mistaken. In one exemplary case of an inaccurate abuse report, a reporter might submit a malicious report on user-generated content (UGC) which is not in violation of standards, or guidelines, established for UGC at an online site, but which expresses views with which the user disagrees.

Abuse reports are typically forwarded to human editor(s) in the order in which they are received, e.g., the order in which they are submitted by users. Reliance on human editors to review the UGC and act on reports on a first in first out (FIFO) basis is not optimal. A review backlog can easily occur and the FIFO approach can easily result in accurate reports of abusive content being effectively ignored while earlier-submitted reports (some of which can be inaccurate reports of abuse) are being reviewed. Any delay in review of UGC that is the subject of an accurate abuse report results in a delay in acting to restrict or remove offensive, or otherwise abusive, UGC from an online site, which is clearly undesirable. Online users offended by content disseminated by an online site are not likely to frequent such an online site.

The automatic online activity abuse report accuracy prediction described herein enables rapid and automatic analysis of information in connection with an abuse report, the output of which includes a prediction of the accuracy of the report without using human editorial input regarding the accuracy of the report. A prediction (generated by the analysis) that an abuse report is accurate can be used to automatically (and without human editorial assessment of the UGC that is the subject of the abuse report) remove the reported UGC, while a prediction (generated by the analysis) that an abuse report is mistaken can be used to automatically (and without human editorial assessment of the abuse report) determine that the reported UGC is to remain accessible via the online site. In either case, action is taken automatically and in response to the automatically-generated prediction without (e.g., prior to) any human editorial assessment of the abuse report. The action(s) taken in response to receipt of the abuse report can comprise assignment of the abuse report to a queue (e.g., a high-priority queue, a low-priority queue, etc.) for review by a human editor. A level of confidence associated with an automatically-generated prediction can be used to determine the priority queue to which the abuse report is assigned for review by a human editor. Prioritization of abuse reports ensures that the human editors can be more effectively utilized. The rapid and automatic abuse report analysis and handling presents improvements to the quality of, and distribution of, user generated content, as well as the quality of content disseminated by an online site.

According to some embodiments, the disclosed systems and methods receive a report, e.g., an abuse report, concerning a UGC item disseminated via an online site. In one example, the report is received via a dialog box which is transmitted to a client computing device for display in response to input from a user of the client computing device indicative of the user's activation of a report abuse button. The received report may include a reason, provided by the user, for the report of abuse in connection with the UGC item. In response to receipt of the report, information is identified, and maintained, in connection with the report. By way of some non-limiting examples, the information includes such information as, and without limitation, the reason given for the report, the user (or reporter) making the report, the user (or poster) that supplied the UGC item. In addition, the information can include historical information, such as and without limitation the frequency with which the reporter reports on the poster's UGC, the accuracy of the report(s) made by the reporter on the poster's UGC, the accuracy of the report(s) made by the reporter on UGC of other poster(s), the frequency with which the poster's UGC are reported by all reporters, the accuracy of reports by all reporters on the UGC of the poster, the accuracy of all reports across reporters and posters. Other information can be used with the systems and methods disclosed herein, such as and without limitation the number of page views that the poster makes between UGC postings, the time delay between posting of the UGC item by the poster and the abuse report by the reporter.

The disclosed systems and methods then use the information to generate a number of features, e.g., generate a feature vector comprising the number of features. The features are input to a pre-trained statistical machine model trained to generate an estimated, or predicted, probability (an accuracy score) concerning the accuracy of the received report. In one example, the trained model is a logistic regression model. The output generated by the pre-trained model includes an accuracy score representing the probability that the UGC item of the poster is abusive, given the report's features input to the model. The output by the trained model generates the abuse report's estimated, or probable, accuracy and is pre-trained using at least some subset of data from a number of previous abuse reports and associated editorial decisions (regarding the abusive nature, or lack thereof, of UGC being reported) made in response to those reports.

The disclosed systems and methods can use the pre-trained (or trained) model to generate a level of confidence, or certainty, in the probability score. The disclosed systems and methods can then use the level of confidence and accuracy score to determine an action, or actions, to be taken in response to the abuse report. As some non-limiting examples, in a case that the abuse report's score is determined to be sufficiently high (e.g., using a first accuracy threshold) and the level of uncertainty in the abuse report's accuracy score is determined to be sufficiently low (e.g., using a first uncertainty threshold) the reported UGC item can be removed from the online site (e.g., so that it is no longer accessible online via the online site) and the abuse report can be added to a low-priority queue for editorial review by a human editor(s); in a case that the abuse report's accuracy score is determined to be sufficiently low (e.g., using a second accuracy threshold) and the level of uncertainty in the abuse report's accuracy score is determined to be sufficiently low (e.g., using the first uncertainty threshold) the reported UGC item can be left on the online site (e.g., so that it is accessible online via the online site) and the abuse report can be placed on the low-priority queue for editorial review by a human editor(s); and, in a case that the abuse report's accuracy score is determined to be sufficiently high (e.g., using the first probability threshold) and the level of uncertainty in the abuse report's accuracy score is determined to be sufficiently high (e.g., using a second uncertainty threshold) the abuse report can be placed on a high-priority queue for editorial review by a human editor(s). In the latter case, while awaiting the editorial review, the UGC item can either be removed from the site pending the review or it can be left on the site pending the review; and such determination might be made, for example, based on the accuracy score and/or the level of uncertainty.

The disclosed systems and methods can generate and train a statistical machine model using labeled training data corresponding to a number of abuse reports and UGC. In one example, the training data can comprise a feature vector generated from information associated with a number of abuse reports and a label, for each abuse report, indicating whether the human editor(s) considered the report to be accurate (i.e., label indicating whether the UGC item identified in the abuse report is considered to be violative of standards).

It will be recognized from the disclosure herein that embodiments of the instant disclosure provide improvements to a number of technology areas, for example those related to systems and processes that handle or process user-generated content generation and delivery of such user-generated content to users over the internet, such as but not limited to, via search engines, local and/or web-based applications, TV widgets, set-top boxes, electronic social networking platforms and the like. The disclosed systems and methods can effectuate increased (much faster than human) speed and efficiency in the ways that abuse reports are acted upon by an online site, thereby minimizing the exposure to offensive, or otherwise abusive, UGC content items via the online site, as the disclosed systems and methods, inter alia, automatically generate an accuracy score indicating the probable accuracy of abuse reports and can then use the automatically-generated accuracy to automatically act on the report and/or the UGC item. Users are provided with a quick response to abuse reports and are provided with an online site without UGC reported to be abusive, or otherwise offensive, to the guidelines, or standards, set by the online site in connection with UGC through the disclosed systems' and methods' automatic analysis and handling of abuse reports. For example, the disclosed accuracy prediction and report handling can timely act on each abuse report received from user, in most cases without any need for any editorial review before acting, as the disclosed systems and methods can automatically generate a score of the probable accuracy of an abuse report (as well as an uncertainty score), and automatically determine an action, or actions, to take using the generated score(s), thus improving an online site, improving experiences of users of the online site, minimizing (or eliminating) the need for human editors, and focusing the limited resources provided by the human editors.

In accordance with one or more embodiments, a method is disclosed which includes receiving, at a computing device over an electronic communications network, an abuse report by a reporting user in connection with a user-generated content item of a posting user, the user-generated content item being posted online by the posting user and made available via an online service; retrieving, via the computing device and for the abuse report, information comprising statistical information corresponding to the posting user, the abuse report, a plurality of posting users posting user-generated content and a plurality of reporting users reporting abuse in connection with the user-generated content; automatically determining, via the computing device and for the abuse report, an n-dimensional feature vector of features, the feature vector determination comprising using the retrieved information comprising the statistical information and contents of the abuse report to determine the features for the abuse report; automatically determining, via the computing device and for the abuse report, an accuracy score for the abuse report based on the abuse report's feature vector, automatic determination of the accuracy score comprising using a pre-trained statistical machine model with the abuse report's feature vector to determine the abuse report's accuracy score, the abuse report's accuracy score being a measure of the abuse report's accuracy of abusiveness of the user-generated content item; automatically determining, via the computing device, an action to take in connection with the abuse report, automatic determination of the action to take being based on the automatically-determined accuracy score; and automatically performing, via the computing device, the automatically-determined action in response to the abuse report.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically predicting the accuracy of an abuse report made in connection with user-generated content and acting on such abuse report in accordance with the automatically-generated accuracy prediction.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which:

FIG. 5 is a diagram of an exemplary example of a non-limiting embodiment in accordance with some embodiments of the present disclosure.

DETAILED DESCRIPTION

Figure 1:
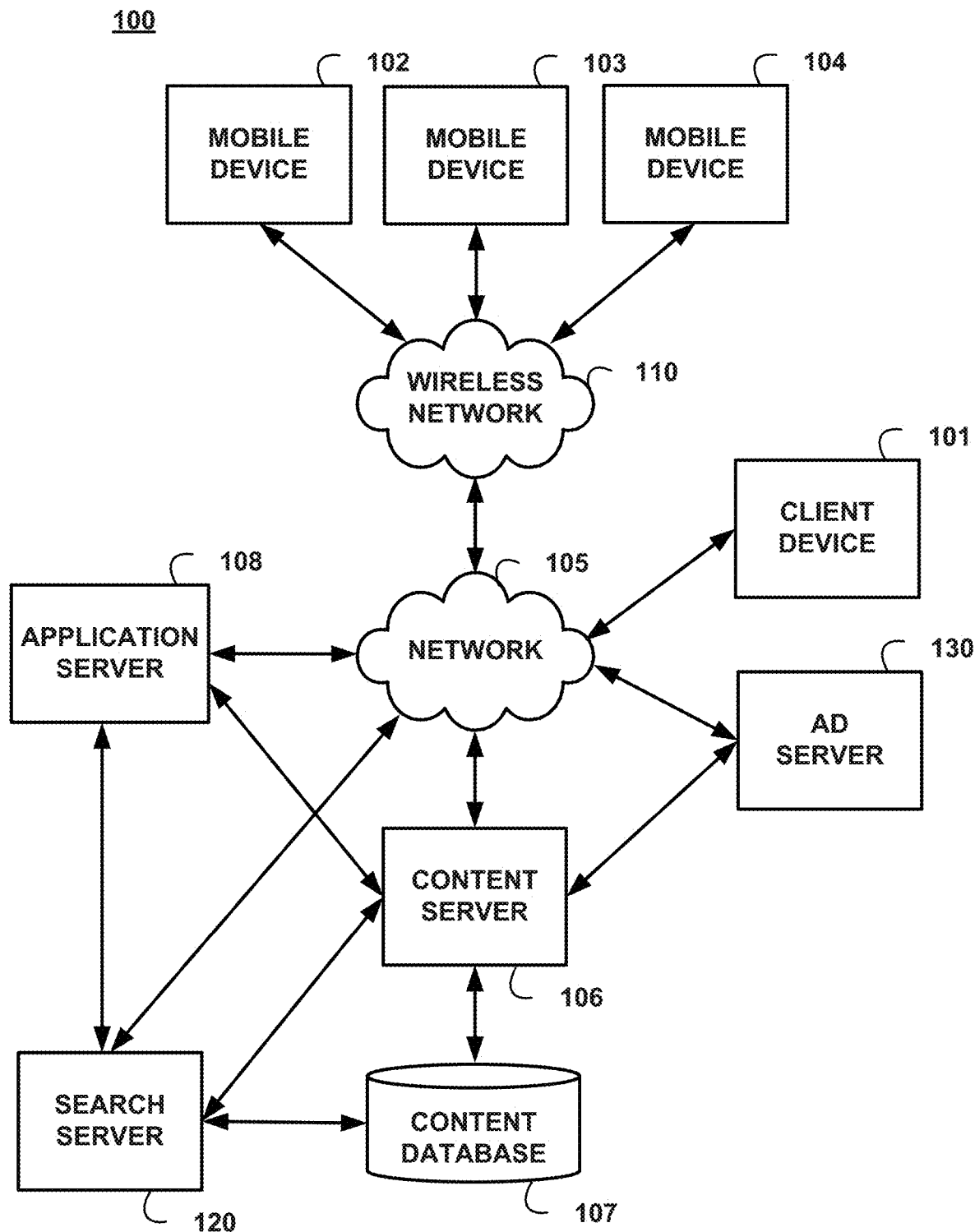
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, user-generated content (UGC) can be any type of content created by users of an online system, service, application or the like By way of one non-limiting example, an online system, service, or application might be accessed via a networked client computing device configured to access a network such as and without limitation the Internet. By way of some non-limiting examples, UGC can include content such as blogs, wikis (e.g., Wikipedia®), collaboratively-modified content, discussion forums, posts, chats, tweets, podcasts, digital images, video, audio, multimedia, comments, reviews, news, fictional content, stories, online publications, social networking site content, links, memes, video clips (e.g., animated videos created using the Graphics Interchange Format, or GIF), crowdsourcing, advertising, social commerce content, or the like. By way of a further non-limiting example, a user can be any entity using an online system, service, application, etc., via a client computing device, to provide content, e.g., content generated by the entity. In one typical scenario, a user is an entity that submits, using a client computing device, content to an online system, service, application, etc., for consumption by other users of the online system, service, application, etc. A user can be an entity that submits, using a client computing device, an abuse report to an online system, service, application, etc.

UGC has become an integral part of a number of online sites. In most cases, UGC is not approved prior to being published, or otherwise made available or disseminated, via an online site. With the vast amount of UGC, it has become virtually impossible for an online site provider to moderate, or monitor, UGC that is made available via the online site. Social networking sites, such as Facebook®, Twitter®, Instagram®, Tumblr®, have become popular for at least the ease with which users can submit UGC. Indeed, the popularity of many online sites is due in part to the UGC that it provides. By its nature, an online site, and hence the UGC provided via the online site, is available to a wide audience. Consequently, a significant issue for an online site provider is to ensure that the UGC provided via the online site is suitable for its audience, e.g., its users. In order to minimize its impact (e.g., minimize user dissatisfaction in an online site), abusive content should be removed as quickly as possible. An online site provider may provide an abuse reporting mechanism, which can be used by its users to report abusive UGC. However, as the volume of UGC increases so does the volume of reports of abuse, and an online site provider typically has limited resources to review reports of abuse regardless of their accuracy. It would be beneficial to be able to automatically predict the accuracy of each report of abuse, and to automatically take action with respect to reports predicted to be accurate (with a correspondingly low level of uncertainty in the prediction), without any human editorial input needed before taking such action.

As such, the instant disclosure provides a novel solution addressing the immediate demand for an automated system, application and/or platform that automatically receive a report, e.g., an abuse report, concerning a UGC item disseminated via an online site. In one example, the report is received via a dialog box which is transmitted to a client computing device for display at the client computing device in response to input from a user of the client computing device indicative of the user's activation of a report abuse button. The received report may include a reason, provided by the user, for the report of abuse in connection with the UGC item. In response to receipt of the report, information is identified, and maintained, in connection with the report. By way of some non-limiting examples, the information can include such information as, and without limitation, the reason given for the report, the user (or reporter) making the report, the user (or poster) that supplied the UGC item. In addition, the information can include historical information, such as and without limitation the frequency with which the reporter reports on the poster's UGC, the accuracy of the report(s) made by the reporter on the poster's UGC, the accuracy of the report(s) made by the reporter on UGC of other poster(s), the frequency with which the poster's UGC are reported by all reporters, the accuracy of reports by all reporters on the UGC of the poster, the accuracy of all reports across reporters and posters. Other information can be used with the systems and methods disclosed herein, such as and without limitation the number of page views that the poster makes between UGC postings, the time delay between posting of the UGC item by the poster and the abuse report by the reporter.

The disclosed systems and methods then use the information to generate a number of features, e.g., generate a feature vector comprising the number of features. The features are input to a model pre-trained to generate an estimated, or predicted, probability concerning the accuracy of the received report. In one example, the trained model is a logistic regression model. The output generated by the trained model includes a probability that the UGC item of the poster (reported by the reporting user via the abuse report) is abusive (e.g., that the abuse report is accurate), given the abuse report's features input to the model. The probability output by the trained model is an estimate which uses at least some subset of data from previous abuse reports and associated editorial decisions made on those reports.

The disclosed systems and methods can generate a level of confidence, or certainty, in the abuse report's accuracy score. The disclosed systems and methods can then use the abuse report's accuracy score alone or in combination with the level of confidence in the abuse report's accuracy score to determine an action, or actions, to be taken in response to the abuse report. As some non-limiting examples, in a case that the abuse report's score is determined to be sufficiently high (e.g., using a first accuracy threshold) and the level of uncertainty in the abuse report's accuracy score is determined to be sufficiently low (e.g., using a first uncertainty threshold) the reported UGC item can be removed from the online site (e.g., so that it is no longer accessible online via the online site) and the abuse report can be added to a low-priority queue for editorial review by a human editor(s); in a case that the abuse report's accuracy score is determined to be sufficiently low (e.g., using a second accuracy threshold) and the level of uncertainty in the abuse report's accuracy score is determined to be sufficiently low (e.g., using the first uncertainty threshold) the reported UGC item can be left on the online site (e.g., so that it is accessible online via the online site) and the abuse report can be placed on the low-priority queue for editorial review by a human editor(s); and, in a case that the abuse report's accuracy score is determined to be sufficiently high (e.g., using the first probability threshold) and the level of uncertainty in the abuse report's accuracy score is determined to be sufficiently high (e.g., using a second uncertainty threshold) the abuse report can be placed on a high-priority queue for editorial review by a human editor(s). In the latter case, while awaiting the editorial review, the UGC item can either be removed from the site pending the review or it can be left on the site pending the review.

The disclosed systems and methods can generate and train machine model using a labeled training data corresponding to a number of abuse reports and UGC. In one example, the training data can comprise a feature vector generated for each abuse report of the number of abuse reports using information associated with each abuse report and a label indicating whether a human editor(s) considered the abuse report to be accurate (a label indicating whether or not the UGC item identified in the abuse report is abusive, e.g., considered to be violative of community standards).

Examples of benefits derived from the disclosed systems and methods include: 1) the disclosed systems and methods provide a technologically-based mechanism for automatic evaluation of the accuracy of an abuse report made in connection with a UGC item; (2) the disclosed systems and methods provide a technologically-based mechanism to automatically act on an abuse report using a predicted accuracy score, which is automatically generated in connection with the UCG item; (3) the disclosed systems and methods provide a technologically-based mechanism to prioritize abuse reports received in connection with UGC; and (4) the disclosed systems and methods provide a technically-based mechanism for predicting an abuse report's accuracy taking into account previous submissions (UGC and/or abuse report user submissions), thereby allowing for both user and content classification. The disclosed systems and methods use techniques that are specifically designed to automatically evaluate the accuracy of abuse reports, for example, which automatic evaluation is used to take a number of automatic actions in connection with each abuse report.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refer to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., You-Tube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
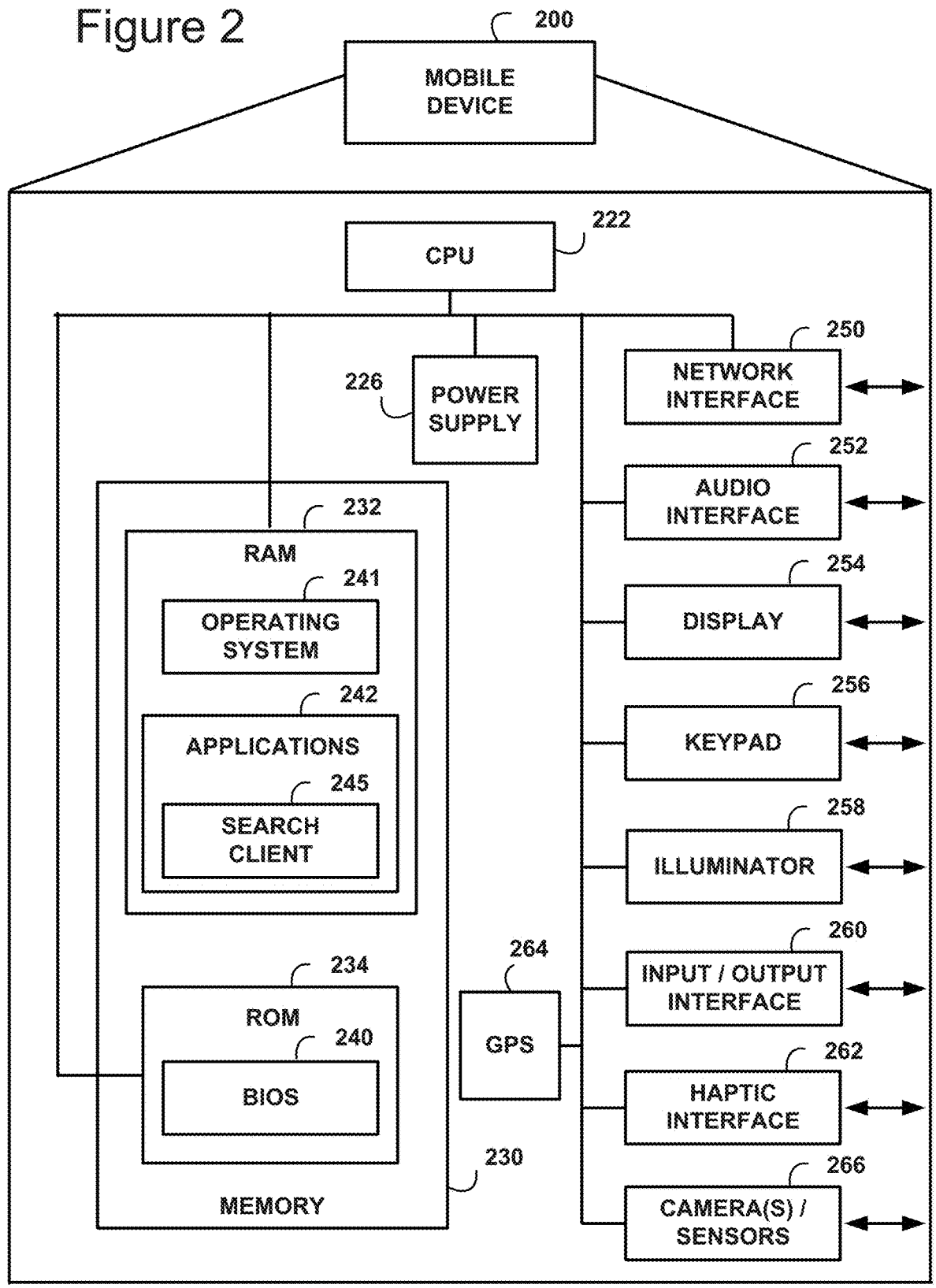
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
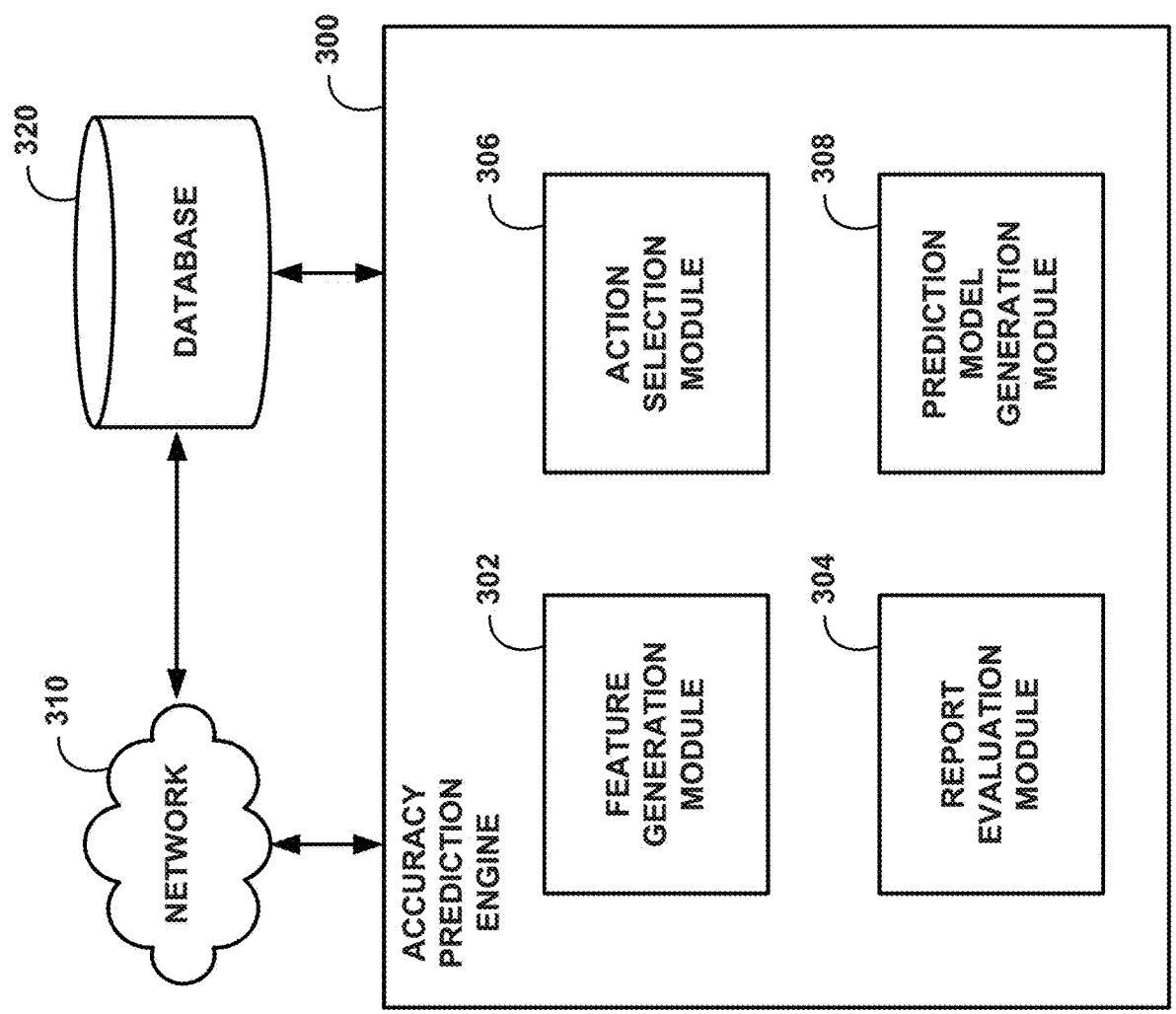
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes an abuse report analysis engine (or analysis engine) 300, network 310 and database 320. The analysis engine 300 can be a special purpose machine or processor and could be hosted by an application server, content server, social networking server, web server, search server, content provider, email service provider, ad server, user's computing device, and the like, or any combination thereof.

The database 320 can be any type of database or memory, and can be associated with a content server on a network (such as and without limitation a content server, search server, application server, etc.,) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data (or information) associated with users of a number of online service(s) (or online sites, online applications, etc.). The users can comprise users posting UGC online (and/or made available) via the online site(s) and users reporting abuse in connection with UGC posted online.

The database 320 can store each UGC item, together with information about each UGC item, such as and without limitation, temporal information (e.g., time and date) of the post, information (e.g., user identifier, user name, etc.) for the user posting the UGC item.

The database 320 can store information about each abuse report, such as and without limitation, the contents of each abuse report (which may include a reason for making the report), temporal information (e.g., time and date of the abuse report), information identifying the reporting user (e.g., user identifier, user name, etc.), information identifying the posting user (e.g., user identifier, user name of the user that posted the UGC item being reported), information identifying the UGC that is the subject of the abuse report, or the like. The information stored in the database 320 can be used to generate a number of statistics, such as and without limitation the number of posts made by any of the users (e.g., UGC posts by all posting users), the number of abuse reports made by any reporters (or reporting users). Other examples of statistical information that can be generated using information stored in the database 320 are discussed herein. The database 320 can also be used to store the statistical information (or statistics) generated using information stored in the database 320.

In a case that human editorial input (e.g., confirmation of the accuracy or inaccuracy) is received in connection with an abuse report, the database 320 can store the human editorial input associated with the abuse report.

The database 320 can store information indicating user behavior, such as and without limitation, information identifying a page view by a user, such as and without limitation user identification information (e.g., user identifier, user name, etc.) for the user viewing the page, a page identifier for the page, and temporal information (e.g., time and date) for the page view by the user.

In addition and with respect to a given abuse report made by a reporting user (e.g., reporting user X) in connection with a UGC item posted by a posting user (e.g., posting user Y), the statistics generated using the information stored in the database 320 can comprise statistics, such as and without limitation, the number of posts by the posting user Y, the number of posts by posting user Y that were reported by all users, the number of posts by posting user Y and confirmed via editorial input, the number of reports by the reporting user X, the number of reported by reporting user X and confirmed via editorial input, the number of posts by posting user Y that were reported by reporting user X, and the number of posts by posting user Y that were reported by reporting user X that were confirmed via editorial input.

According to some embodiments, such statistical information can be used to determine a number of features for each abuse report. A set of features (including the features generated using the statistical information) generated for an abuse report can be represented as an n-dimensional vector (or feature vector). By way of some examples, the n-dimensional vector can comprise a set of features comprising without limitation raw counts, beta distribution parameters, beta distribution mean and variance, log of raw counts, binned raw counts, binned beta parameters, cross-product features, or the like. Other information that may be considered includes the number of page view the posting user makes between postings, the time delay between a UGC posting and the report of abuse made in connection with the UGC posting.

Database 320 can store the set of features (e.g., as an n-dimensional vector) for a given abuse report. Furthermore, database 320 can store any editorial input, confirming the accuracy or inaccuracy of the abuse report (e.g., editorial input confirming whether or not the UGC reported by the abuse report is considered to be abusive). Such editorial input can be used as labeling input when training a statistical machine model, which can be used to determine an accuracy score for a received abuse report having a set of features. Such storage can be realized through any known or to be known vector or array storage, including but not limited to, a hash tree, queue, stack, VList, or any other type of known or to be known dynamic memory allocation technique or technology.

While the discussion below will involve vector analysis (e.g., logistic regression analysis) of information in connection with an abuse report, as discussed above, the abuse report information can be analyzed, stored and indexed according to any known or to be known computational analysis technique (using and applying the specific variables disclosed herein), such as, but not limited to, cluster analysis, data mining, Bayesian network analysis, Hidden Markov models, artificial neural network analysis, logical model and/or tree analysis, and the like.

The network 310 can be any type of network such as, but not limited to, a wireless network, a local area network (LAN), wide area network (WAN), the Internet, or a combination thereof. The network 310 facilitates connectivity of the engine 300, and the database of stored resources 320.

Indeed, as illustrated in FIG. 1, the engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as engine 300, and includes feature generation module 302, abuse report evaluation module 304, action selection module 306, and prediction model generation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the engine 300 can be supplied to the database 320 in order to ensure that the information housed in the database 320 is up-to-date as the disclosed systems and methods leverage real-time information associated with each abuse report, user (e.g., posting user and reporting user) and/or UGC during or responsive to abuse report feature generation, abuse report analysis and handling and accuracy prediction statistical machine model generation, as discussed in more detail below.

Figure 4:
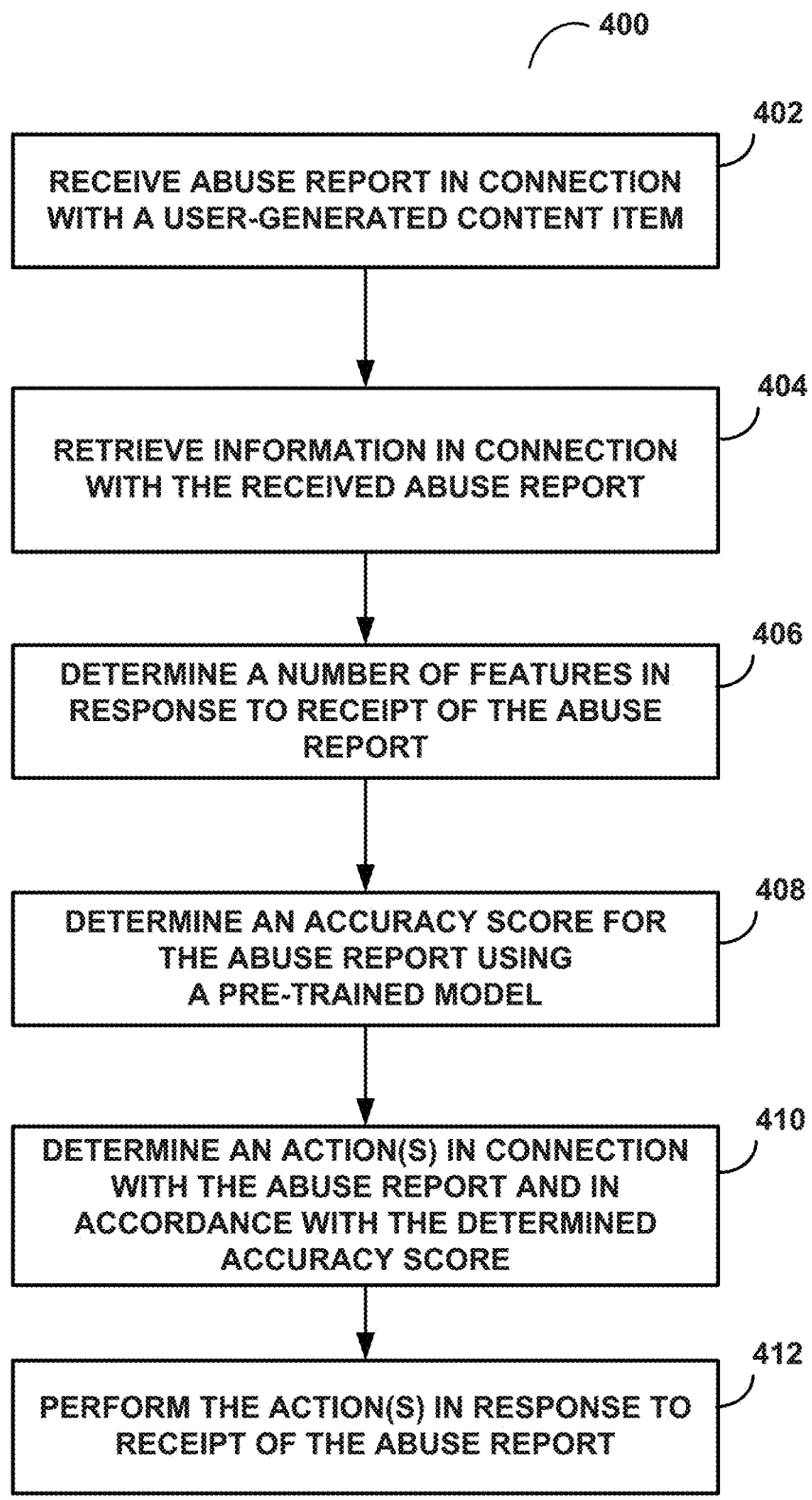
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically generating an accuracy score for an abuse report and automatically taking some action in accordance with the automatically-generated accuracy score in response to receipt of the accuracy report. According to some embodiments, as discussed herein with relation to FIG. 3, the process involves receiving an abuse report in connection with a UGC item, automatically generating a set of features for the abuse report, automatically generating an accuracy score, which estimates the accuracy of the abuse report in connection with the UGC item, and automatically taking action in accordance with the automatically-generated accuracy score in response to receipt of the abuse report reporting abuse in connection with the UGC item, as is discussed in more detail below. Such accuracy score prediction involves use of a pre-trained statistical machine model trained using training data comprising abuse report feature sets and associated editorial input, as is discussed in more detail below.

At step 402, an abuse report is received by engine 300. As discussed herein, the received abuse report concerns a UGC item disseminated via an online site. In one example, the report is received via a dialog box which is transmitted to a client computing device for display in response to input from a user of the client computing device indicative of the user's activation of a report abuse button in connection with the UGC item. In one example, the user may be experiencing (e.g., listening and/or viewing) the UGC item in a web page (provided by an online site) that includes the abuse report button. The report button may be associated with the UGC item or the user may be asked to provide input (e.g., selection of the UGC item) to identify the UGC item. In any case, the received abuse report is associated with the UGC item. The received report may include a reason, provided by the user, for the report of abuse in connection with the UGC item.

At step 404, which is performed by feature generation module 302, information is retrieved in response to receipt of the abuse report. By way of some non-limiting examples, the information retrieved can include information identified, and maintained, in connection with the abuse report, the posting user, the reporting user as well as historical information identified and maintained in connection with other abuse reports.

By way of some non-limiting examples, the information about the received abuse report can include such information as, and without limitation, the reason given for the report, the reporting user (or reporter) making the report, the posting user (or poster) that supplied the UGC item. The historical information can include such information as, without limitation, the frequency with which (e.g., the number of times that) the reporter reports on the poster's UGC, the accuracy of the report(s) made by the reporter on the poster's UGC, the accuracy of the report(s) made by the reporter on UGC of other poster(s), the frequency with which (e.g., the number of times that) the poster's UGC are reported by all reporters, the accuracy of reports by all reporters on the UGC of the poster, the accuracy of all reports across reporters and posters. Other information can be used with the systems and methods disclosed herein, such as and without limitation the number of page views that the poster makes between UGC postings, the time delay between posting of the UGC item by the poster and the abuse report by the reporter.

At step 406, which is performed by feature generation module 302, a number of features are determined in response to receipt of the abuse report. According to some embodiments, step 406 involves determining a set of features (which may be represented as an n-dimensional feature vector) comprising raw counts, beta distribution parameters for a number of probabilities, beta distribution mean and variance for a number of probabilities, logarithms of raw counts, binned raw counts, binned beta parameters, and cross-product features, each of which are discussed in more detail below. In at least one embodiment, the features determined for the abuse report are determined using information identified, and maintained, in connection with the abuse report, the posting user, the reporting user as well as historical information identified and maintained in connection with other abuse reports.

Raw counts, log of raw counts, and binned raw counts, can involve a number of different categories of information associated with the received abuse report as well as historical information associated with other received abuse reports. By way of some non-limiting examples, the raw count statistical information included in the feature set in certain embodiments comprises a count of each of: the number of posts by all users (including the reporting and posting users), the number of abuse reports by all users (including the reporting and posting users), the number of posts by the posting user, the number of posts by the posting user reported as abusive by any user (including the reporting user), the number of posts by the posting user reported as abusive by any user and editorially confirmed (e.g., by at least one human editor), the number of reports by the reporting user (regardless of the posting user), the number of editorially-confirmed reports made by the reporting user (regardless of posting user), the number of posts made by the posting user and reported by the reporting user, the number of posts by the posting user reported by the reporting user and editorially confirmed to be abusive.

In one embodiment, the raw counts can be determined from information stored in the database 320 without regard to temporal information. Alternatively, the raw counts can be a subset of the stored information, which is selected based on a given time frame, such as and without limitation within the last year, the last six months, last month, etc.

The log (or logarithm) of raw counts and the binned raw counts can be determined from the raw counts. A log of a raw count such as the number of posts by all users, can be determined using a logarithm of the raw count, e.g., a logarithm of the number of posts by all users. The feature set can comprise a log of each raw count, e.g., a log of each of the raw counts discussed herein.

In at least one embodiment, the feature set comprises a number of binning features, which comprise bins for the raw counts. In the case of the raw count of the number of postings, for example, the feature set can include a number of bins with each bin corresponding to a range of counts (e.g., 1-2, 3-9, 10-20, 21-50, etc.) with a value of 1 used for the bin corresponding to the raw count and a value of 0 being used for each other bin. In a case that the raw count of the number of postings of 47 and a 21-50 bin, for example, a value of 1 is used for the 21-50 bin and a value of 0 is used for each other bin. The examples, such as the number of bin and/or the range of values associated with each bin, used herein are intended only for illustration and should not limit the scope of disclosure provided herein.

As discussed above, the set of features can include beta distribution parameters for a number of probabilities, beta distribution mean and variance for a number of probabilities, and binned beta parameters. The raw counts can be used to determine a mean and variance, which can be used to determine beta distribution parameters $\alpha$ and $\beta$. Reference is respectfully made to FIG. 5, which provides some non-limiting examples of probabilities for which beta distribution parameters can be determined for inclusion in the set of features. In the non-limiting example of FIG. 5, table 500 includes columns 502 and 504 and rows 506-518. Each row identifies a pair of summary statistics in column 502 and an estimated probability using the pair of summary statistics. With reference to row 506, for example, the number of posts by all users and the number of abuse reports by all users can be used to determine an estimated probability that a post is reported.

In accordance with at least one embodiment, the feature set comprises beta distribution parameters, $\alpha$ and $\beta$, determined (using the corresponding pair of summary statistics) for each estimated probability shown in column 504. In accordance with such embodiments, the feature set includes (for each estimated probability) a binning of the beta distribution parameters for an estimated probability. As discussed herein, a binning can comprise a number of bins, each of which corresponds to a range of values (e.g., a range of $\alpha$ values, range of $\beta$ or a range of $\alpha$ and $\beta$ values). In addition and in accordance with such embodiments, the feature set includes the mean and variance determined (using the corresponding pair of summary statistics) for each estimated probability shown in column 504.

The set of features can include a number of cross-product features. In one example, a cross product feature can involve a cross product of the number of posts by all users and the number of posts by posting users. A cross product can allow for discounting when a variance is large, for example.

The set of features can include a number of features determined using contents of the abuse report. By way of some non-limiting examples, the set of features can include a feature indicating whether or not a reason is included in the abuse report, the length (e.g., the number of words) of the reason given in the abuse report, presence and/or absence of certain words (or keywords) used in the reason, or the like. A number of features can be included in the set of features in connection with other information, such as the number of page views that the poster makes between UGC postings, the time delay between posting of the UGC item by the poster and the abuse report by the reporter, or the like.

Referring again to FIG. 4, step 408, which is performed by abuse report evaluation module 304, involves automatically determining an accuracy score for the received abuse report. Step 408's accuracy score is associated with a determination of an action, or actions, to be taken in response to receipt of the abuse report. As discussed herein, in accordance with at least one embodiment, such a determination can involve using a determined level of uncertainty associated with the accuracy score. As discussed herein, the received abuse report's accuracy score (as well as an associated level of uncertainty) is based on the abuse report's features, which can include a number of features, as discussed herein. The set of features determined for the abuse report can be represented as an n-dimensional feature vector.

Step 408 involves determining (or determining a probability or estimating) the received abuse report's accuracy. An abuse report's accuracy (or accuracy score) is determined using a pre-trained statistical machine model that determines an abuse report's accuracy using the abuse report's features (e.g., an abuse report's n-dimensional feature vector). At step 408, the abuse report evaluation module 304 estimates the accuracy of the abuse report received at step 402 by applying a logistic regression function, which comprises a set of optimized weighted parameters, to the abuse report's feature vector and returning an output score. The weighted parameters of the trained model are determined using a training data set.

At step 408, in accordance with at least one embodiment, the received abuse report's features (e.g., represented as an n-dimensional feature vector) are input to at least one pre-trained model trained to generate an estimated, or predicted, probability of the accuracy of the received report. In one example, the trained model is a logistic regression model. The output generated by the trained model includes a probability that the UGC item of the poster is abusive, given the report's features input to the model. The probability output by the trained model is an estimate which uses at least some subset of data from previous abuse reports and associated editorial decisions made on those reports.

In accordance with embodiments, using prediction model generation module 308, a pre-trained statistical machine model is trained using a training dataset comprising a number of abuse reports, e.g., the feature vectors associated with each of a number of abuse reports, and editorial input corresponding with each abuse report. In other words, each abuse report of the number included in the training data set used to train a model has a corresponding feature vector and an editorial label (determined using editorial input) indicating whether or not the abuse report is accurate. As such, a supervised learning approach can be used in training the model's regression function.

A model can be generated (or an existing model can be re-trained) periodically using a rolling temporal window. In one example, abuse reports and corresponding editorial input for a first temporal window (e.g., a number of hours, days, weeks, months, etc.) can be used to train a first model, and a second model can be trained using abuse reports and corresponding editorial input from a second temporal window subsequent to the first temporal window can be used to train a second model.

In accordance with some embodiments, a number of pre-trained models (e.g., the pre-trained models corresponding to a number of temporal windows) can be used to determine a number of accuracy scores in connection with the abuse report received in step 402. The number of accuracy scores can be used to determine a variance in the accuracy scores. The determined variance can represent a level of uncertainty in the accuracy score determined at step 408.

Therefore, step 408 as discussed above involves the abuse report evaluation module 304 applying a pre-trained model's regression function to the abuse report's feature vector and returning an accuracy score representing an accuracy of the abuse report. In at least one embodiment, the accuracy score is a primary accuracy score determined at step 408 using the model trained using the most-recently trained model (e.g., the model trained using training data from a current temporal window). In some embodiments, a number of additional (or secondary) accuracy scores can be determined using a number of other pre-trained models (e.g., model(s) trained using prior temporal window(s)) and the abuse report's feature vector; and the accuracy scores generated for the abuse report (e.g., the secondary accuracy score(s) alone or in combination with the primary accuracy score) can be used to determine a variance representing a level of uncertainty in the primary accuracy score.

At step 410, which is performed by the action selection module 306, the determined accuracy score, e.g., the primary accuracy score, can be used alone or in combination with the determined level of uncertainty in the determined accuracy score to determine an action, or actions, to be taken in response to the abuse report. As some non-limiting examples, in a case that the abuse report's score is determined to be sufficiently high (e.g., using a first accuracy threshold) and the level of uncertainty in the abuse report's accuracy score is determined to be sufficiently low (e.g., using a first uncertainty threshold) the reported UGC item can be removed from the online site (e.g., so that it is no longer accessible online via the online site) and the abuse report can be added to a low-priority queue for editorial review by a human editor(s); in a case that the abuse report's accuracy score is determined to be sufficiently low (e.g., using a second accuracy threshold) and the level of uncertainty in the abuse report's accuracy score is determined to be sufficiently low (e.g., using the first uncertainty threshold) the reported UGC item can be left on the online site (e.g., so that it is accessible online via the online site) and the abuse report can be placed on the low-priority queue for editorial review by a human editor(s); and, in a case that the abuse report's accuracy score is determined to be sufficiently high (e.g., using the first probability threshold) and the level of uncertainty in the abuse report's accuracy score is determined to be sufficiently high (e.g., using a second uncertainty threshold) the abuse report can be placed on a high-priority queue for editorial review by a human editor(s). In the latter case, while awaiting the editorial review, the UGC item can either be removed from the site pending the review or it can be left on the site pending the review; and such determination might be made, for example, based on the determined accuracy score and/or the level of uncertainty.

In the above examples, the determined accuracy score is used in combination with the level of uncertainty in determining the action(s) to be taken in connection with the abuse report received at step 402. It should be apparent that the determined accuracy score can be used without the level of uncertainty in the above examples.

At step 412, which is performed by action selection module 306, the action(s) identified at step 410 are automatically performed in response to the abuse report received at step 402. For example, access to the UGC item that is the subject of the received abuse report can be prohibited or limited (e.g., a warning regarding the abusive nature of the UGC item is provided to the user and the UGC item is only provided to the user in response to a request by the user). By way of another non-limiting example, the abuse report can be added to a high priority queue for editorial review or alternatively to a low priority queue for editorial review. As yet another non-limiting example, access to the UGC item can remain the same as it was prior to receipt of the abuse report.

Since, as described herein, a received abuse report's accuracy can be determined and the action(s) can be identified and performed automatically in response to receipt of the abuse report and without human effort (e.g., human editorial involvement), the abuse report can be acted on immediately and without delay (e.g., avoiding delay caused by a human editor). UGC that is accurately (based on a determination made as described herein) reported as being abusive can be removed from an online site with minimal, if any, delay, and UGC that is inaccurately (based on a determination made as described herein) reported as abusive need not be arbitrarily removed and can remain on the online site so that it is accessible to users. Human editorial resources can be better focused where necessary by prioritizing the received abuse reports so that abuse reports that require human editorial review are given higher priority over other abuse reports, thereby minimizing waste of such a resource and avoiding delays caused by editorial review of such abuse reports. Expedient removal of abusive content without arbitrary removal of other content inaccurately reported as abusive increases user engagement in an online site's content and increases the number of active users engaged.

Figure 6:
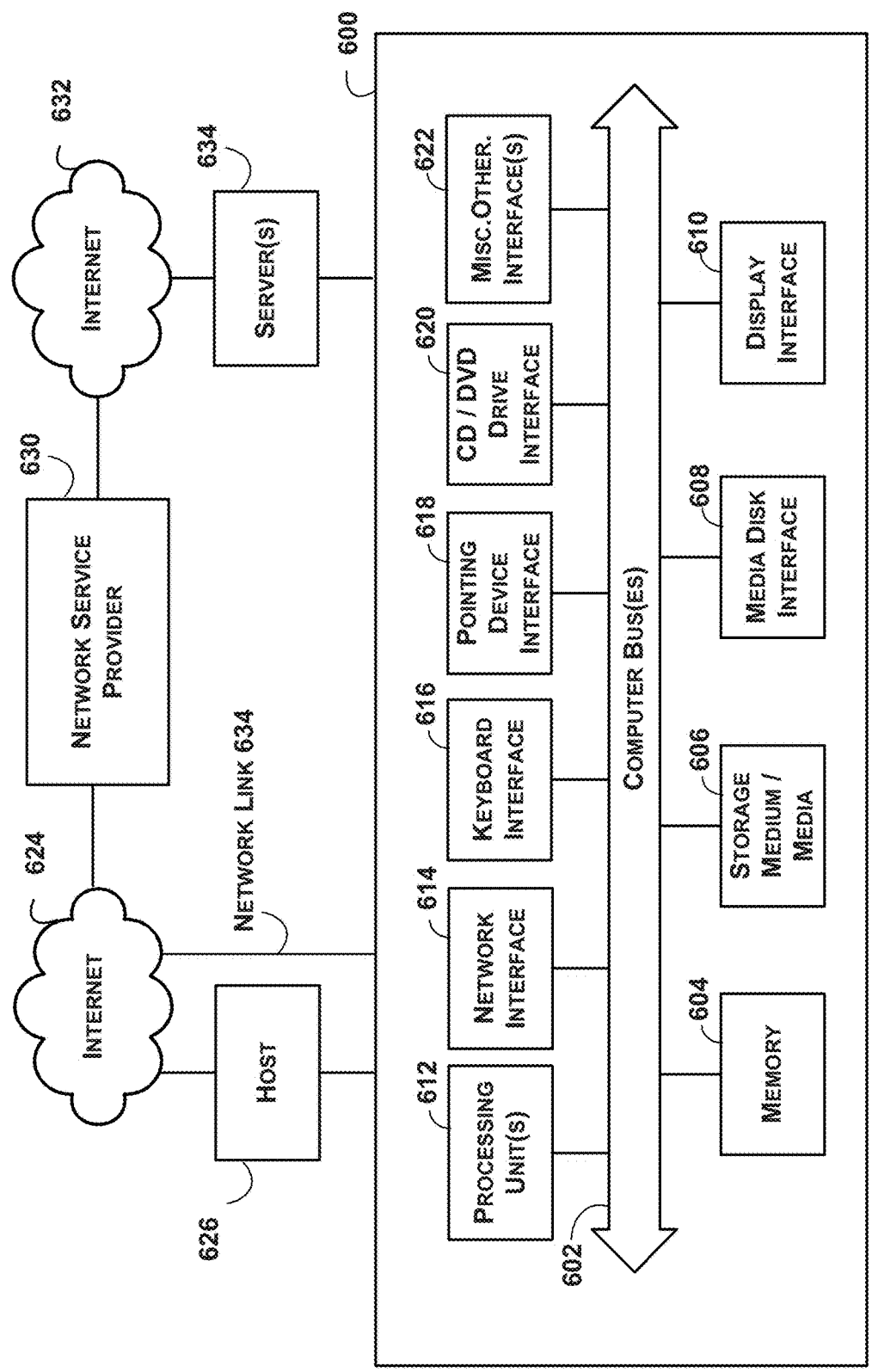
FIG. 6 is a block diagram illustrating the architecture of an exemplary hardware device in accordance with one or more embodiments of the present disclosure.

As shown in FIG. 6, internal architecture 600 of a computing device(s), computing system, computing platform, user devices, set-top box, smart TV and the like includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
   receiving, at a computing device over an electronic communications network, an abuse report from a reporting user in connection with a user-generated content item of a posting user, the user-generated content item having been received as an online post from the posting user and made available via an online service;

retrieving, via the computing device and for the abuse report, information comprising statistical information corresponding to the posting user, the abuse report, a plurality of posting users posting user-generated content and a plurality of reporting users reporting abuse in connection with the user-generated content;

automatically determining, via the computing device and for the abuse report, an n-dimensional feature vector of features, the feature vector determination comprising using the retrieved information comprising the statistical information and contents of the abuse report to determine the features for the abuse report;

automatically determining, via the computing device and for the abuse report, an accuracy score for the abuse report based on the abuse report's feature vector, automatic determination of the accuracy score comprising using a pre-trained statistical machine model with the abuse report's feature vector to determine the abuse report's accuracy score, the abuse report's accuracy score being a measure of the abuse report's accuracy of abusiveness of the user-generated content item;

automatically determining, via the computing device, an action to take in connection with the abuse report, automatic determination of the action to take being based on the automatically-determined accuracy score; and automatically performing, via the computing device, the automatically-determined action in response to the abuse report.

2. The method of claim 1, further comprising:
determining, via the computing device, a level of uncertainty in the accuracy score, the automatic determination of the action to take in connection with the abuse report being further based on the determined level of uncertainty in the determined accuracy score.

3. The method of claim 2, determination of the level of uncertainty in the accuracy score comprising:
automatically determining, via the computing device and for the abuse report, a plurality of accuracy scores using a plurality of pre-trained statistical machine models and the abuse report's feature vector, determination of the level of uncertainty in the accuracy score comprising determining a variance in the plurality of accuracy scores and using the determined variance as the level of uncertainty in the accuracy score.

4. The method of claim 2, automatic performance of the automatically-determined action in response to the abuse report comprising:
causing, via the computing device, the user-generated content item to become inaccessible via the online site in a case that the automatically-determined accuracy score is determined to be sufficiently high using an accuracy threshold and the level of uncertainty in the determined accuracy score is determined to be sufficiently low using an uncertainty threshold.

5. The method of claim 4, automatic performance of the automatically-determined action in response to the abuse report further comprising causing, via the computing device and in response to the abuse report, the abuse report to be added to a low-priority queue for editorial review by a human editor.

6. The method of claim 2, automatic performance of the automatically-determined action in response to the abuse report comprising:
causing, via the computing device and in response to the abuse report, the user-generated content item to remain accessible via the online site in a case that the automatically-determined accuracy score is determined to be sufficiently low using an accuracy threshold and the level of uncertainty in the determined accuracy score is determined to be sufficiently low using an uncertainty threshold.

7. The method of claim 6, automatic performance of the automatically-determined action in response to the abuse report further comprising causing, via the computing device and in response to the abuse report, the abuse report to be added to a low-priority queue for editorial review by a human editor.

8. The method of claim 2, automatic performance of the automatically-determined action in response to the abuse report comprising:
causing, via the computing device and in response to the abuse report, the abuse report to be added to a high-priority queue for editorial review by a human editor.

9. The method of claim 8, automatic performance of the automatically-determined action in response to the abuse report further comprising causing, via the computing device and in response to the abuse report, the user-generated content item to be inaccessible via the online site awaiting input from the human editor.

10. The method of claim 8, automatic performance of the automatically-determined action in response to the abuse report further comprising causing, via the computing device and in response to the abuse report, the user-generated content item to be remain accessible via the online site awaiting input from the human editor.

11. The method of claim 1, the statistical information comprising a number of posts by the plurality of posting users, a number of abuse reports made by the plurality of reporting users, a number of posts by the posting user, a number of posts by the posting user reported as abusive by the plurality of reporting users, a number of posts by the posting user reported as abusive by the plurality of reporting users and editorially confirmed, a number of reports by the reporting user, a number of editorially-confirmed reports made by the reporting user, a number of posts made by the posting user and reported by the reporting user, and a number of posts by the posting user reported by the reporting user and editorially confirmed to be abusive.

12. The method of claim 1, the n-dimensional feature vector comprising raw count features, beta distribution parameter features for a number of probabilities, beta distribution mean and variance features for the number of probabilities, logarithmic raw count features, binned raw count features, binned beta parameter features, and cross-product features.

13. The method of claim 12, the number of probabilities comprising a probability that a post is reported, a probability that a post by the posting user is reported, a probability that a post by the posting user that is reported is confirmed as accurate, a probability that a post is reported by the reporting user, a probability that any abuse report by the reporting user is confirmed as accurate, a probability that any post by the posting user is reported by the reporting user, and a probability that any post by the posting user is reported by the reporting user and is confirmed as accurate.

14. A non-transitory computer-readable storage medium tangibly encoded with computer-executable instructions that when executed by a processor associated with a computing device perform a method comprising:
receiving, over an electronic communications network, an abuse report from a reporting user in connection with a user-generated content item of a posting user, the user-generated content item having been received as an online post from the posting user and made available via an online service;

retrieving, for the abuse report, information comprising statistical information corresponding to the posting user, the abuse report, a plurality of posting users posting user-generated content and a plurality of reporting users reporting abuse in connection with the user-generated content;

automatically determining, for the abuse report, an n-dimensional feature vector of features, the feature vector determination comprising using the retrieved information comprising the statistical information and contents of the abuse report to determine the features for the abuse report;

automatically determining, for the abuse report, an accuracy score for the abuse report based on the abuse report's feature vector, automatic determination of the accuracy score comprising using a pre-trained statistical machine model with the abuse report's feature vector to determine the abuse report's accuracy score, the abuse report's accuracy score being a measure of the abuse report's accuracy of abusiveness of the user-generated content item;

automatically determining an action to take in connection with the abuse report, automatic determination of the action to take being based on the automatically-determined accuracy score; and automatically performing the automatically-determined action in response to the abuse report.

15. The non-transitory computer-readable storage medium of claim 14, further comprising:

determining a level of uncertainty in the accuracy score, the automatic determination of the action to take in connection with the abuse report being further based on the determined level of uncertainty in the determined accuracy score.

16. The non-transitory computer-readable storage medium of claim 15, determination of the level of uncertainty in the accuracy score comprising:

automatically determining, for the abuse report, a plurality of accuracy scores using a plurality of pre-trained statistical machine models and the abuse report's feature vector, determination of the level of uncertainty in the accuracy score comprising determining a variance in the plurality of accuracy scores and using the determined variance as the level of uncertainty in the accuracy score.

17. The non-transitory computer-readable storage medium of claim 14, the statistical information comprising a number of posts by the plurality of posting users, a number of abuse reports made by the plurality of reporting users, a number of posts by the posting user, a number of posts by the posting user reported as abusive by the plurality of reporting users, a number of posts by the posting user reported as abusive by the plurality of reporting users and editorially confirmed, a number of reports by the reporting user, a number of editorially-confirmed reports made by the reporting user, a number of posts made by the posting user and reported by the reporting user, and a number of posts by the posting user reported by the reporting user and editorially confirmed to be abusive.

18. The non-transitory computer-readable storage medium of claim 14, the n-dimensional feature vector comprising raw count features, beta distribution parameter features for a number of probabilities, beta distribution mean and variance features for the number of probabilities, logarithmic raw count features, binned raw count features, binned beta parameter features, and cross-product features.

19. The non-transitory computer-readable storage medium of claim 18, the number of probabilities comprising a probability that a post is reported, a probability that a post by the posting user is reported, a probability that a post by the posting user that is reported is confirmed as accurate, a probability that a post is reported by the reporting user, a probability that any abuse report by the reporting user is confirmed as accurate, a probability that any post by the posting user is reported by the reporting user, and a probability that any post by the posting user is reported by the reporting user and is confirmed as accurate.

20. A computing device comprising:

a processor;

a non-transitory storage medium for tangibly storing thereon program logic for execution by the processor, the program logic comprising:

receiving logic executed by the processor for receiving, over an electronic communications network, an abuse report from a reporting user in connection with a user-generated content item of a posting user, the user-generated content item having been received as an online post from the posting user and made available via an online service;

retrieving logic executed by the processor for retrieving, for the abuse report, information comprising statistical information corresponding to the posting user, the abuse report, a plurality of posting users posting user-generated content and a plurality of reporting users reporting abuse in connection with the user-generated content;

determining logic executed by the processor for automatically determining, for the abuse report, an n-dimensional feature vector of features, the feature vector determination comprising using the retrieved information comprising the statistical information and contents of the abuse report to determine the features for the abuse report;

determining logic executed by the processor for automatically determining, for the abuse report, an accuracy score for the abuse report based on the abuse report's feature vector, automatic determination of the accuracy score comprising using a pre-trained statistical machine model with the abuse report's feature vector to determine the abuse report's accuracy score, the abuse report's accuracy score being a measure of the abuse report's accuracy of abusiveness of the user-generated content item;

determining logic executed by the processor for automatically determining an action to take in connection with the abuse report, automatic determination of the action to take being based on the automatically-determined accuracy score; and performing logic executed by the processor for automatically performing the automatically-determined action in response to the abuse report.

* * * * *